United States Patent [19]
Mesiti et al.

[11] 3,930,886
[45] Jan. 6, 1976

[54] POROUS FLUORO-CARBON POLYMER MATRICES

[75] Inventors: Edward C. Mesiti, Jenkintown, Pa.; Solomon Rosenblatt, Montclair, N.J.

[73] Assignee: Leesona Corporation, Warwick, R.I.

[22] Filed: June 18, 1973

[21] Appl. No.: 370,719

Related U.S. Application Data

[60] Continuation of Ser. No. 197,932, Nov. 11, 1971, abandoned, Division of Ser. No. 850,339, Aug. 12, 1969, Pat. No. 3,627,859, which is a continuation of Ser. No. 543,786, April 20, 1966, abandoned, which is a continuation-in-part of Ser. No. 491,864, Sept. 30, 1965, abandoned.

[52] U.S. Cl. .................... 136/146; 264/49; 264/127
[51] Int. Cl.² .......................................... H01M 2/14

[58] Field of Search ........... 136/146, 142, 143, 144, 136/145, 148; 264/49, 127

[56] References Cited
UNITED STATES PATENTS

| | | | |
|---|---|---|---|
| 3,418,168 | 12/1968 | Wentworth | 136/86 |
| 3,497,256 | 2/1970 | Rosenblatt | 264/44 |
| 3,702,267 | 11/1972 | Grot | 136/146 |
| 3,749,604 | 7/1973 | Langer et al. | 136/146 |

*Primary Examiner*—John H. Mack
*Assistant Examiner*—H. A. Feeley
*Attorney, Agent, or Firm*—A. W. Breiner

[57] ABSTRACT

An improved hydrophobic polymer matrix having preselected wettable characteristics.

5 Claims, No Drawings

POROUS FLUORO-CARBON POLYMER MATRICES

This is a continuation of U.S. Ser. No. 197,932 filed Nov. 11, 1971 now abandoned. The invention is a divisional of the invention claimed and described in application Ser. No. 850,339 filed Aug. 12, 1969, now U.S. Pat. No. 3,627,859; which in turn is a continuation of Ser. No. 543,786 filed Apr. 20, 1966, now abandoned, which is a continuation-in-part of Ser. No. 491,864 filed Sept. 30, 1965, now abandoned.

The present invention relates to the production of a porous hydrophobic matrix, having pre-determined wetting characteristics, useful as filters, separators, diaphragms and the like. More particularly, the invention relates to porous membranes or shaped articles of sinterable, corrosion and heat resistant fluoro-polymers. The invention will be described hereinafter with particular reference being made to elements such as porous barriers, supports in electrode construction, or matrices for retaining an electrolyte, for use in an electrochemical cell, and more particularly in a fuel cell. It is to be understood, however, that the materials of the invention have other utility where the peculiar characteristics of the composition are important as will be apparent to one skilled in the art. Reference to a fuel cell is by way of convenience and sets forth a preferred utility for the materials.

The principal requisites of a matrix or separator of the class useful in electrochemical cells are maximum chemical stability, low electrical resistance, and maximum diffusion of electrolyte in order to minimize the internal resistance of the over-all assembly. Other necessary properties include sufficient mechanical strength to withstand handling during assembly of the cell, shape and dimensional stability when wet with electrolyte, controlled porosity and sufficient density to act as a physical barrier to resist penetration of the matrix by the gaseous reactants piercing the separator and possible short circuiting of the cell by metallic growths.

For optimum performance in a fuel cell employing a trapped aqueous electrolyte, the matrix should be wettable by the electrolyte to the extent that the electrolyte forms a continuous phase which is in intimate contact with one surface of each electrode. Moreover, the combination of matrix and electrolyte must act as an effective bubble barrier to avoid the mixing of reactant gases at one electrode surface to prevent reactions of an explosive nature. The electrolyte matrix must also have a porosity sufficient to permit the necessary ionic mobility requisite to the ionic conductance internal to the cell structure at minimum resistivity and be inert to the electrolyte impregnated therein. To avoid a current flow within the electrolyte systems per se, with consequent wastage of utilizable power, the matrix must be an excellent electrical insulator. The matrix must also have a sufficient degree of pliability to conform to the surfaces of the electrodes of the cell so as to maintain the highest degree of area of contact therebetween and avoid areas of separation therefrom. Since the matrix must also function as a physical barrier to the mixing of the gaseous reactants, th matrix for a trappd electrolyte is ordinarily employed in fuel cell constructions wherein the matrix is compressed about the peripheral edges in sealing engagement with a suitable apertured framing member and/or cooperable sealing means or gasket. Therefore, the matrix preferably will have properties commendable to gasketing or sealing means. To minimize the cost the matrix should be constructed of materials which are readily available and manufactured by a quick, easy, efficient process, and the matrix preferably re-utilizable by replenishing with fresh aqueous electrolyte.

Materials currently employed as matrices for trapped electrolyte systems include various materials such as modified cellulose and pressed mineral fibers such as asbestos, alumina, magnesia and the like. Such materials currently in use as matrix forming materials suffer from a number of serious drawbacks, the principal among them being lack of chemical and/or thermal stability and poor mechanical strength. By way of example, asbestos impregnated with an aqueous alkali such as potassium hydroxide is readily attached to produce gelatinous residues which interfere with the ionic conductance, increase internal cell resistance and are incapable of being reimpregnated with fresh electrolyte. Modified cellulose, on the other hand, is easily hydrolized by the electrolyte.

The use of microporous polymeric films as elements in electrochemical cells, such as battery separators, is not new. For example, U.S. Pat. Nos. 2,542,527 and 2,676,929 disclose processes wherein polymeric materials such as polyvinyl chloride or polyethylene are admixed with finely-ground starch particles and the mixture cast into sheets. The starch particles are hydrolyzed and rendered soluble by successive treatments and washing in both acid and alkaline media, leaving in their place voids of the approximate size of the original particles. While this type of microporous material has found some commercial application in the battery art, its principal disadvantages are the relatively high cost of manufacture, the difficulty experienced during manufacture in maintaining control of the pore size in the finished product, mechanical weakness of the resultant matrix, and the inability of the process to achieve pores with surfaces of controlled wetting characteristics, which are desirable in many fuel cell applications.

Accordingly, it is one object of the present invention to provide a method for fabricating a matrix free, or substantially free, of the defects associated with the aforementioned matrices of the prior art.

It is another object of the present invention to provide a method for producing matrices for trapped electrolytes, or as electrode supports for use in the fuel cell art permitting selective control of pore diameter, adjustability of dimensions, selection of degree and type of wettability and the desired surface texture.

It is another object of the present invention to provide a matrix in accordance with the foregoing objectives utilizing a polyfluoroethylene polymer.

The foregoing objectives, as well as additional objectives, advantages and features realizable from the present invention, will be more clearly seen from the following description, with particular emphasis being placed on the working examples.

In accordance with the present invention, a porous fluoropolymer matrix is made by precipitating the polymer from a colloidal state onto a loose slurry of selected and oppositely charged fibers, such as cellulose fibers. The charge on the fibers is induced by the adsorption of cationic agents on their surface. The fiber/polymer ratio and the diameter of the fiber determines porosity and pore size respectively. The plastic coated coagulum is extracted from the slurry and dried. The fibers may be either re-slurried in water and re-deposited upon a paper mat by processes known to the art or compressed into a sheet in a suitable mold. The dried sheet or mat is placed in a furnace adjusted to the sintering temperature of the hydrophobic polymer, causing the fibers to burn out, leaving a porous plastic structure behind.

Varying wetting characteristics and pore surface texture can be produced according to the present invention by adsorbing a colloidal mineral of desired dimensions onto the surface of the fiber in an aqueous medium and precipitating the finely divided particulate fluoro-polymer from an aqueous dispersion onto the mineral modified surface of the fiber, and collecting the resulting coagulum. The coagulum can be formed into any desired shape, which is then subjected to elevated temperatures sufficient to cause the particular hydrophobic polymer to sinter to a pliable coherent mass and to cause the fibrous substrate to undergo combustion, forming a combustion product, exposing the volume previously occupied by the fibrous substrate, and leaving the colloidal mineral distributed uniformly throughout the pore structure and firmly held therein. In an electrolyte matrix the mineral additives, or fillers, act as "stepping stones", allowing the "electrolyte" to achieve ionic conductive continuity between the electrodes as a result of their particular wetting characteristics. Any carbonaceous residue in the structure can be removed by treating the sintered material with a strong oxidizing acid, such as nitric acid, prior to the final drying. The resulting composition has a pore surface texture and chemical composition which is readily wettable by an aqueous electrolyte. The electrical resistivity of the porous material when used as a matrix for a trapped electrolyte, or as a support for an electrode, is materially reduced and the ionic conductivity enhanced to a high degree.

In practicing the present invention, a staple cellulosic, or similar fiber of the desired dimensions can be suspended in an aqueous medium by such conventional methods as the action caused by a plurality of blades rotating at high speeds to produce a severing action upon the fibrous material, and thereby causing the formation of a pulp or suspension of fibers corresponding to the desired dimensions of the ultimate pore structure of the matrix. A colloidal mineral can be added to the resulting suspension and caused to sorb upon the surface thereof by the addition of cationic agents or like means. The particulate hydrophobic polymer is precipitated from a colloidal state into a loose slurry of the fibers, or the polymer is added to the aqueous dispersion of fibers, and a coagulating or flocculating agent added to cause coagulation or precipitation to form a polymer/fiber coagulum, or a polymer/colloidal mineral/fiber coagulum or aggregate.

The coagulum is capable of separation and extrusion by conventional processes to form articles of any desired shape suitable for the ultimate purposes intended. The shaped article is subjected to temperatures sufficient to cause sintering of the particulate polymer, causing formation of a coherent pliable mass having a porosity controlled by the amount of cellulosic fibers therein, through combustion of the fibers forming a carbonaceous combustion product and thereby exposing the volume previously occupied by the cellulosic fiber.

The preliminary coalescence of the polymer/fiber, or polymer/colloidal mineral/fiber aggregate to form the sinterable stock of the present invention is accomplished by an organic coalescing or flocculating agent which is mixable with water and in which the polymeric material is substantially insoluble. Exemplary flocculating or coalescing agents include acetone, methyl ethyl ketone, methanol, ethanol and like compounds. The sinterable stock from the initial coalescing can be formed into membranes or other desired shapes through conventional extrusion or orifices extrusion slots or by resuspension in an aqueous medium and collection by mechanical means, such as forced filtration of the aqueous phase and the like.

Complete coalescence of the polymer particles to form a continuous polymeric phase in the formation of the porous article is achieved by sintering. Development of optimum mechanical properties is dependant in part upon the ratios of polymer : mineral : fibrous substrate as well as in part upon the sintering conditions, since incomplete sintering results in weak spots and corresponding poor mechanical properties. The optimum sintering temperature appears to be approximately 350° – 400°C. although temperatures as high as 430°C. can be successfully employed with some fluoropolymers such as polytetrafluoroethylene. In general, sintering is effected at a temperature between the crystaline melt point, e.g., in the case of polytetrafluoroethylene, 327°C., and the decomposition temperature of the hydrophobic polymer. While higher temperatures in general require shorter sintering times, temperatures in excess of 400°C., e.g. in the case of polytetrafluoroethylene, tend to promote appreciable degradation. Any suitable heating media such as the hot air of a muffled furnace, radiant heat, heated rollers or platens and the like may be employed in the sintering operation.

Although particular reference has been made hereinbefore to polytetrafluoroethylene, which is the preferred polymer in the practice of the present invention, other polyhalogenated polymers can be used. By way of example copolymers of tetrafluoroethylene with other unsaturated organic compounds such as perfluoropropylene, chlorotrifluoroethylene and the like may be employed provided such copolymers maintain the essential properties of the tetrafluoroethylene homopolymer. In general, copolymerizable modifiers may be present in an amount up to about 15% by weight of the copolymer without destroying or deviating from the advantageous properties of the tetrafluoroethylene. Other plastics usable herein are polymers of fluorinated propylene, vinyfluoride, vinylidene fluoride, and copolymers thereof.

The production of the fluor-polymer dispersion is not a part of the present invention. The dispersion may be prepared by any suitable process described in the existing art including, by way of example, procedures disclosed in U.S. Pat. No. 2,478,229; U.S. Pat. No. 2,534,058; U.S. Pat. No. 2,559,750; and U.S. Pat. No. 2,685,707. The particle size of the polymer in the dispersions employable in the practice of the present invention may vary over a wide range. Preferably, the particles of the polymer should be of a colloidal state, e.g., a practical size range being from 0.05 to about 5 microns and more preferably, from about 0.1 to about 3 microns in size. The smaller the particles the more easily is the formation of the sinterable stock and the workup of the sinterable stock to the ultimate, porous shaped structure. The fluoro polymer can vary widely as to molecular weight. Advantageously, weights for the fluoro polymer of 8,000 or higher are employed. As employed herein the term "hydrophobic polymer" or fluoro polymer refers to polymers such as, e.g., polytetrafluoroethylene and the like, noted above, which have crystaline melt temperatures above about 300°C. and are sinterable at temperatures from around their crystaline melt temperature to the decomposition temperature of the respective polymer. Suitable starting materials of this type include aqueous suspensions containing 60% by weight of polytetrafluoroethylene particles, available under the trade names Teflon 30, Teflon 41X and the like. Such dispersions may contain compatible wetting agents which may be of cationic, non-ionic and anionic types. Where the polymeric dispersion contains such wetting or stabilizing agents, precipitation of the particulate polymer onto the surfaces of the cellulosic fibrous substrate or colloidal mineral modified cellulosic fibrous substrate is facilitated by use of precipitating agents inducing the opposite charge upon the substrate particles.

The fibrous pore forming substrate can be formed by any conventional mechanical and/or chemical pulp forming procedure employed in the paper making or like art. The fibrous pulp can be prepared from flax, cereal straws, wood products and like cellulosic pulp rendering starting materials. The degradation by mechanical and/or chemical means is continued until a fibrous pulp suspension is obtained having the requisite dimensional parameters. As the size of the pore structure in the ultimate sintered composition corresponds closely to the dimension of the volume occupied by the fibrous substrate prior to combustion thereof to form the gaseous product which exposes the volume to ambient, the dimension of the fibrous substrate employed in compounding the sinterable stock will depend upon the use and characteristics desired of the ultimate porous membrane composition. By way of example, in the use of the sinterable stock to form a porous wettable membrane matrix for trapped electrolytes in gas consuming fuel cells, a fibrous suspension wherein the individual fibers have an average cross section of from about 0.5 to about 20 microns and more advantageously from about 1 to about 5 microns is preferred. For other uses such as battery diaphragms, electrode supports and the like, the fibers can have an average diameter of from about 0.5 to about 200 microns. The length of the fiber can vary, again being determined by their ultimate use. In general fibers having an average length of from about 5 microns to about 10 millimeters can be employed.

In a preferred embodiment of the invention, colloidal mineral components increasing the wettability of the hydrophobic fluoro plastics are incorporated into the pore structure of the matrix by sorbing suitable colloidal minerals on fibrous cellulose prior to the deposition of the colloidal hydrophobic polymer to form the coagulum or aggregate. When the final structure is subjected to the sintering temperatures of the fluoropolymer the cellulosic material burns out leaving the wetting filler deposited in the pore structure previously occupied by the cellulosic material and now exposed to ambient by the decomposition gases. The resulting structure is characterized by good mechanical strength, high porosity, selective wetting characteristics and excellent stability to chemical attack by the electrolytes. The chemically stable aqueous wettable fillers function as "stepping stones" to permit the electrolyte to achieve a phase continuity over the surfaces defining the pores of the porous matrix between the electrodes. For optimum capillary requirements the chemically stable wettable fillers should preferably have a particle size in the 0.01 to 0.2 micron range. Exemplary wettable fillers for filling the aforesaid capillary requirements include exploded silicon dioxide, potassium titanate, titanium dioxide, thoria zirconia and the like. The aforesaid wettable fillers may be in fibrous or powder form.

Having described the invention in general terms, to more particularly illustrate the invention a detailed working example will be set forth.

EXAMPLE

Twelve grams of ashless filter paper (no. 41 Watman), 250cc's of distilled water, and one cc of a 10% aqueous solution of pelargonate quaternary amine hydrochloride, and 6 grams of colloidal silica, are charged to a Waring type blender and mixed for fifteen minutes at approximately three-quarters the rated capacity of the blender. Sixty grams of a 50% by volume aqueous dispersion of polytetrafluoroethylene, stablized with a non-ionic surfactant, is added to 100cc's of distilled water and the mixture charged to the blender while the blender is turned on at 30% of the maximum speed. After all the dispersion has been added the resultant charge is agitated for an additional fifteen minutes. Thereafter, with the mixture subjected to a constant speed, approximately 30% of the maximum blender speed, 150cc's of acetone is added and the mixture stirred for an additional five minutes.

The coagulated slurry is collected by filtration in a vacuum funnel and the resultant cake dried at 100°C. at 25 inches of vacuum for sixteen hours. The resulting dried cake is broken up in the blender until a loose, fluffy, fibrous product is obtained. Three grams of the resultant loose fibers and 150cc's of distilled water are mixed in the blender at high speed for one minute. Trapped air is removed in a vacuum assembly. A 9 centimeter filter paper is placed on a vacuum funnel and the slurry deposited thereon. The slurry is allowed to settle slowly in the absence of a vacuum for approximately two minutes and a vacuum then applied until water is no longer extractable. The upper surface can be rendered more even by pressing down upon the mat with a filter paper of the same size as below. The resulting slurried cake is dried overnight at 150°F. The filter papers are removed and the mat placed in a muffle furnace at 670°F. for 15 minutes, or until all the cellulose is burned out. The mat is allowed to cool slowly at room temperature and the resultant porous plastic sheet is placed in a hot nitric acid reflux assembly and boiled until the plastic achieves its characteristic off-white color. The matrix is prepared above has excellent utility in a fuel cell for retaining an aqueous electrolyte, or as a support in electrode construction. In the electrode construction, one surface of a thin sheet of the matrix is coated with an activating material such as platinum black and the polytetrafluoroethylene surface maintained in contact with the fuel gas, with the activated surface being in contact with the electrolyte.

Additionally, in example 1, prior to the addition of the polymer dispersion, chemically stable wettable fillers such as exploded silicon dioxide, potassium-titanate, titanium dioxide, thoria zirconia, either in powder or fiber form, can be added to the fibrous suspension. The resultant product will be similar to the product obtained in the example except that the inert filler will be present at the porous openings of the plastic matrix. This expediency permits the tailor-making of the matrix as to surface properties, such as wetting and the like.

Although the present invention has been described with emphasis being placed upon fuel cell applications, it is apparent, as noted in the preamble of the specification, that the described structures will have numerous applications as filters, diaphragms and the like. The hydrophobic polymer structures can be made having varying porosities and pore sizes, including membranes where the actual porosity is not discernible, i.e., where it is doubtful whether the pores are in the sub-micron range or are present as simple spaces between molecular chains. Since the pore size can be accurately determined, and because of the chemical inertness and heat resistant properties of the matrices, they can be used in numerous applications which will be apparent to one skilled in the art. Furthermore, according to the present invention it is possible to construct the novel matrix around a support such as a metal screen to improve its mechanical stability and render the matrix electrically conductive. The various modifications of the matrices and their numerous applications are to be included herein, with the invention only being limited by the appended claims.

It is claimed:

1. A hydrophobic polymeric matrix having preselected wettable characteristics comprising a continuous phase of sintered fluorocarbon polymeric material having a series of integral interconnecting pores and a discontinuous colloidal mineral phase deposited in or at the surfaces of said pores, said mineral phase being uniformly arranged from major surface to major surface of said matrix:

2. The matrix according to claim 1 wherein the particulate fluorocarbon polymer has an average particle size of from about 0.1 to about 50 microns and the pores have an average diameter of from about 0.5 to 10 microns and said colloidal mineral filler has an average particle size of from about 0.01 to 0.2 microns.

3. The matrix according to claim 2 wherein the ratio of fluorocarbon polymer to colloidal mineral filler is from about 0.1 to about 10.0 on a weight basis.

4. A membrane forming composition that comprises a porous film-like fluorocarbon polymeric matrix formed of a sintered particulate fluorocarbon polymer, said matrix having a finely divided solid electrolyte stable wettable mineral uniformly dispersed in the pores thereof and firmly held therein, the finely divided particulate mineral being present in an amount sufficient to permit an aqueous phase to achieve continuity throughout the porous structure.

5. The combination in an electrolytic cell, of at least one negative electrode and at least one positive electrode, and an electrolyte confined between said positive and said negative electrodes and in contact therewith comprising an aqueous electrolyte and a chemically inert highly porous matrix formed of a sintered finely divided fluorocarbon polymer, said matrix sintered to a coherent pliable mass, characterized by a large number of inter-connected pores, which matrix has a finely divided electrolyte stable, wettable mineral uniformly dispersed throughout the interconnecting pores and firmly held therein, characterized by its impermeability to transfer therethrough of gaseous products and having a continuity of electrolyte phase throughout said inter-connecting pores of said matrix establishing a high degree of electrochemical activity and high degree of ionic conductivity.

* * * * *